US009620082B2

(12) United States Patent
Saber et al.

(10) Patent No.: US 9,620,082 B2
(45) Date of Patent: Apr. 11, 2017

(54) CORRECTING ARTIFACTS ON A DISPLAY

(71) Applicant: Hewlett-Packard Development Company, L.P., Houston, TX (US)

(72) Inventors: Eli Saber, Webster, NY (US); Marvin D. Nelson, Boise, ID (US); Michael A. Stauffer, Boise, ID (US); David G. Bohan, Boise, ID (US); Rakshit Sunil Kothari, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/713,278

(22) Filed: May 15, 2015

(65) Prior Publication Data

US 2016/0335744 A1    Nov. 17, 2016

(51) Int. Cl.
| | |
|---|---|
| *G09G 5/10* | (2006.01) |
| *G09G 5/00* | (2006.01) |
| *G06T 7/20* | (2006.01) |
| *H04N 1/40* | (2006.01) |
| *H04N 9/64* | (2006.01) |
| *G06T 5/00* | (2006.01) |
| *G06T 7/00* | (2017.01) |

(52) U.S. Cl.
CPC ............. *G09G 5/10* (2013.01); *G06T 5/005* (2013.01); *G06T 7/0004* (2013.01); *G06T 2207/10024* (2013.01)

(58) Field of Classification Search
CPC combination set(s) only.
See application file for complete search history.

(56) References Cited

U.S. PATENT DOCUMENTS

| | | | |
|---|---|---|---|
| 6,243,070 B1 | 6/2001 | Hill et al. | |
| 6,854,828 B2 * | 2/2005 | de Pena | B41J 2/2132 347/15 |
| 7,064,768 B1 | 6/2006 | Bao | |
| 7,724,397 B2 * | 5/2010 | Lee | B41J 29/393 347/40 |
| 7,978,214 B2 * | 7/2011 | Plotkin | H04N 1/1911 347/254 |
| 8,264,562 B2 | 9/2012 | Cho | |
| 8,396,261 B2 | 3/2013 | Deonarine et al. | |
| 2007/0229665 A1 * | 10/2007 | Tobiason | H04N 5/3572 348/187 |
| 2009/0037795 A1 * | 2/2009 | Verdu | H03M 13/1111 714/780 |

(Continued)

FOREIGN PATENT DOCUMENTS

DE    102006021442 A1    11/2007

OTHER PUBLICATIONS

Ali, T. et al., "Automatic Red-eye Detection and Correction," (Research Paper), Feb. 17-18, 2009, 4 Pages, available at http://ieeexplore.ieee.org/xpl/login.jsp?tp=&arnumber=1038147&url=http%3A%2F%2Fieeexplore.ieee.org%2Fxpls%2Fabs_all.jsp%3Farnumber%3D1038147.

*Primary Examiner* — Wesner Sajous (74) *Attorney, Agent, or Firm* — HP Inc. Patent Department (57) ABSTRACT

An example involves identifying a first artifact in an image on a display, the first artifact caused by a first subpixel of a first pixel, determining a type of the first artifact based on a location of the first artifact relative to content of the image, and correcting the first artifact to remove the appearance of the first artifact from the display based on the type of the first artifact.

9 Claims, 8 Drawing Sheets

(56) References Cited

U.S. PATENT DOCUMENTS

| | | | |
|---|---|---|---|
| 2009/0262260 A1* | 10/2009 | Jaynes | H04N 9/3182 348/744 |
| 2010/0033633 A1* | 2/2010 | Dane | H04N 19/176 348/625 |
| 2011/0090537 A1* | 4/2011 | Fischer | H04N 1/4055 358/3.2 |
| 2011/0254847 A1* | 10/2011 | Au | G06T 3/4023 345/428 |
| 2013/0230150 A1* | 9/2013 | Weiss | G01T 7/005 378/207 |
| 2014/0268136 A1* | 9/2014 | Pawluczyk | H04N 5/367 356/326 |

* cited by examiner

CORRECTING ARTIFACTS ON A DISPLAY

BACKGROUND

Flat panel displays are frequently used in consumer products, such as printers, scanners, mobile devices, etc. Example flat panel displays may be implemented by a light emitting diode (LED) display or a liquid crystal display (LCD). An example LED display includes an array of pixels consisting of LEDs (e.g., red LEDs, blue LEDs, and green LEDs). An example LCD include a backlight source, polarizing fillers, and electrically modulated liquid crystals that vary transmission (light emission) based on signals applied to the crystals.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve identifying artifacts (e.g., fringe artifacts) on a display and correcting the artifacts such that they may not be perceived by a viewer of the display. In examples disclosed herein, potential artifact locations are identified and analyzed to determine whether the artifacts are to be corrected. Correcting the identified artifacts is performed based on the types of the identified artifacts. Accordingly, examples disclosed herein identify the artifacts and analyze the artifacts to classify the artifacts for appropriate correction.

As used herein an artifact is a display error or anomaly perceived by a user due to aliasing (color fringing) or ineffective pixel geometry. As used herein a pixel is a display unit of a display that is comprised of subpixels or subpixel components, such as light emitting diodes (in LED displays) or liquid crystals (in liquid crystal displays (LCDs).

In many displays different subpixel or LED pattern arrangements (e.g., triangular (Delta) row arrangements) may induce artifacts. For example, in low resolution displays, relatively sparsely arranged display elements (e.g., LEDs, liquid crystals, etc.) with an offset between adjacent pixels (or subpixels) may induce artifacts such as apparent jagged edges or bright red dots. In some examples, due to the offset, diagonally adjacent red subpixel elements produce red dot artifacts in regions of high contrast (e.g., text, lines, edges in graphics, etc.). These artifacts may arise due to aliasing (e.g., color fringing) or ineffective pixel geometry. The apparent artifacts in the display may cause a presentation to appear inaccurate or unpleasant. In examples disclosed herein, apparent artifacts (e.g., red dot artifacts) in a display may be corrected in near real-time (e.g., within 10 milliseconds) or as images are presented rendered) on a display.

An example method includes identifying an artifact in an image on a display. The example artifact may be caused by a subpixel of a pixel of the display. Furthermore, the example method may determine a type of the artifact based on a location of the artifact relative to content of the image and correct the artifact to remove the appearance of the artifact from the display based on the type of the artifact.

Figure 1:
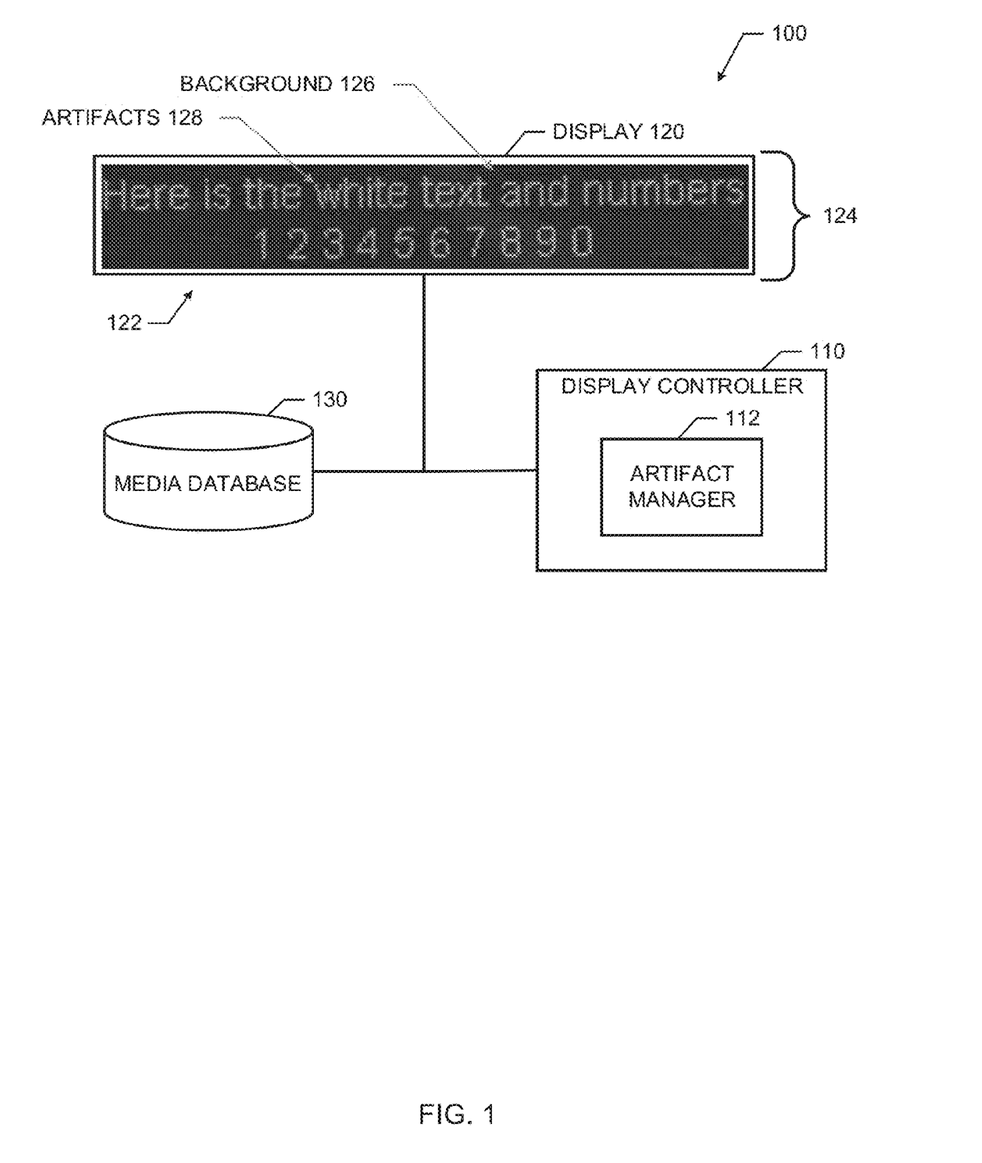
FIG. 1 is a schematic diagram of an example display system including an artifact manager according to an example.

FIG. 1 is a schematic diagram of a display system 100 including a display controller 110 having an artifact manager 112 constructed in accordance with examples herein. The example display system 100 includes the display controller 110, a display 120, and a media database 130. The example display system 100 may be implemented by a mobile device (e.g., cellular phone, personal digital assistant, an mp3 player, etc.), a printer, a scanner, a computer, or any other type of electronic device. In examples disclosed herein, the artifact manager 112 of the display controller 110 may identify artifacts in an image from the media database 130 presented on the display 120 and perform a correction to remove the artifacts from the image.

The example display 120 of FIG. 1 may be implemented by a flat panel display, such as an LED display or an LCD. In some examples, the display 120 is a low resolution display including a triangular row arrangement (e.g., a delta arrangement) in which pixels of respective rows are offset from one another. The display 120 may be a display of a printer, a mobile device, a scanner, or any other electronic device. In the illustrated example of FIG. 1, the display 120 is presenting an image 122 including text 124 (i.e. "Here is the white text and numbers 1 2 3 4 5 6 7 8 9 0") against a background 126. The example image 122 in the display 120 of FIG. 1 appears to have artifacts 128 near or around portions of the text 124, as further described below in the connection with FIG. 3. The artifacts 128 appear as defects in the image 122 that cause the text 124 to appear unclear or distorted.

In examples disclosed herein, the text 124 is presented as white text and the background 126 appears black, which creates a high contrast appearance between the text 124 and the background 126. The example artifacts 128 may cause the white text 124 to have a red "glow" around portions of the text caused by red dot artifacts that appear as fringe artifacts. For example, due to spatial proximity of red subpixels in contrasting image regions (e.g., regions around the white text 124, such as corners or edges), red dot artifacts or fringe artifacts may appear. The red dot artifacts may appear to a user (e.g., be brighter than the white text) due to the eyes and/or brain of the user identifying or focusing on different color spectrums based on its spatial location (e.g., between the text 124 and background 126) in the image 122. Although the examples disclosed herein may refer to correction of the artifacts 128 on the display 120 or the image 122 of FIG. 1 as fringe artifacts or red dot artifacts, any other artifacts or types of artifacts in any image or type of image may be corrected using the examples disclosed herein.

In the illustrated example of FIG. 1, the display controller 110 may be a processor or computer platform (e.g., of a computer, of a mobile device, of a printer, etc.) that implements the artifact manager 112. The display controller 110 controls signals to a pixel array of the display 120 to present media (e.g., images, text, documents, etc.) from the media database 130 on the display 120. In examples disclosed herein, the display controller 110 may retrieve the media from the media database 130 and present the media on the display 120. The example media database 130 may be any database or storage device that includes media (e.g., images, text, documents, video, etc.) that may be presented on the display 120.

In examples disclosed herein, the artifact manager 112 of the display controller 110 may analyze the media data (e.g., the data stored in the media database) or the display data (e.g., the data representative of control signals sent to the pixel array of the display 120) to identify and correct artifacts in the media as the media is presented on the display 120 (e.g., in real time or near real time (e.g., within 10 ms)) in accordance with examples herein. An example implementation of the artifact manager 112 is further described in connection with FIG. 2.

Figure 2:
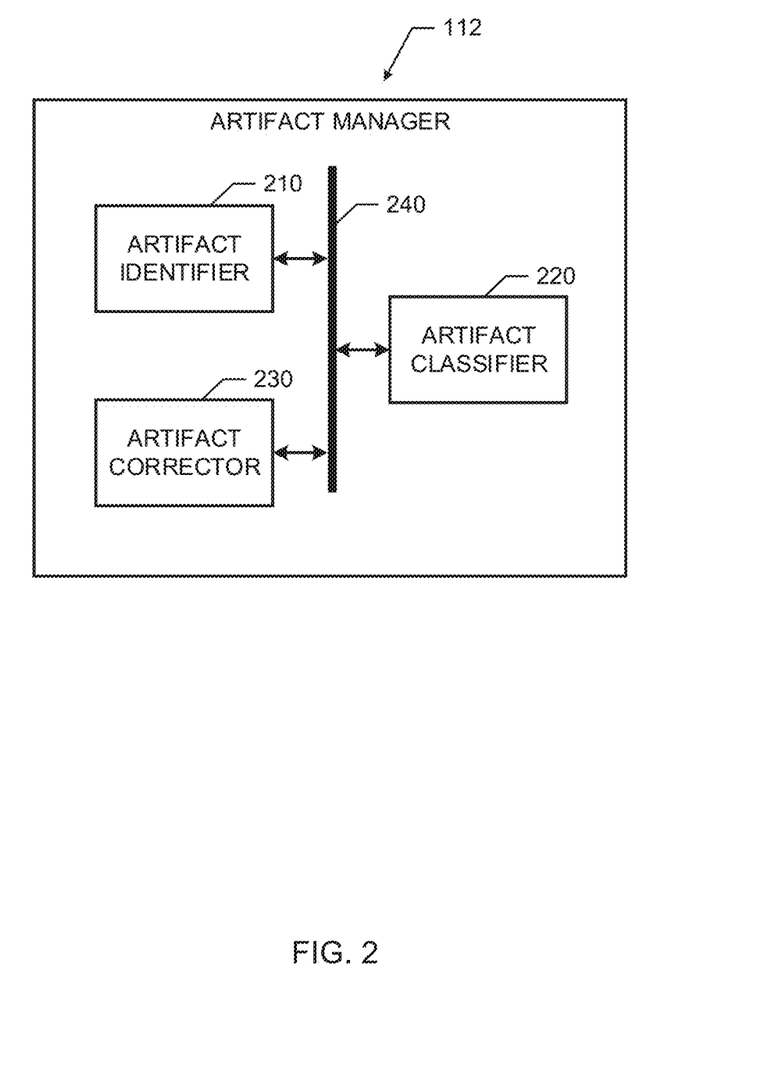
FIG. 2 a block diagram of an example artifact manager that may be used to implement the artifact manager in the example display system of FIG. 1.

FIG. 2 is a block diagram of an example artifact manager 112 that may be used to implement the artifact manager 112 of FIG. 1. The example artifact manager 112 of FIG. 2 includes an artifact identifier 210, an artifact classifier 220, and an artifact corrector 230. A communication bus 240 facilitates communication between the artifact identifier 210, the artifact classifier 220, and the artifact correct 230. In examples disclosed herein, the artifact identifier 210 identifies pixels or subpixels that cause or potentially cause artifacts (e.g., fringe artifacts, red dot artifacts, etc.), the artifact classifier 220 determines types of the identified artifacts (e.g., singlet artifacts, doublet artifacts, triplet artifacts, etc.), and the artifact corrector 230 corrects the artifacts in accordance with aspects of this disclosure.

The example artifact identifier 210 identifies artifacts (e.g., fringe artifacts, red dot artifacts, etc.) in the image 122 when presented on the display 120. In examples disclosed herein, the artifact identifier 210 may determine a location of pixels that may lead to the artifacts (which may be referred to herein as potential artifact pixels). In some examples, the artifact identifier 210 may iteratively scan or analyze portions of an image (e.g., the image 122 of FIG. 1) corresponding to lines (e.g., rows or columns) of pixels of a display (e.g., the display 120) until the full image is analyzed. For example, to identify artifacts in a portion of the image 122 of FIG. 1, the artifact identifier 210 may analyze signals (e.g. display data) sent to the display 120 that illuminate three lines of pixels corresponding to the portion of the image 122. After the example portion of the image 122 is analyzed, the artifact identifier 210 may analyze another portion (e.g., a subsequent portion) of the image 122 until the full image 122 is analyzed. The artifact identifier 210 may notify the artifact classifier 220 of any identified artifacts for further analysis.

Figure 3:
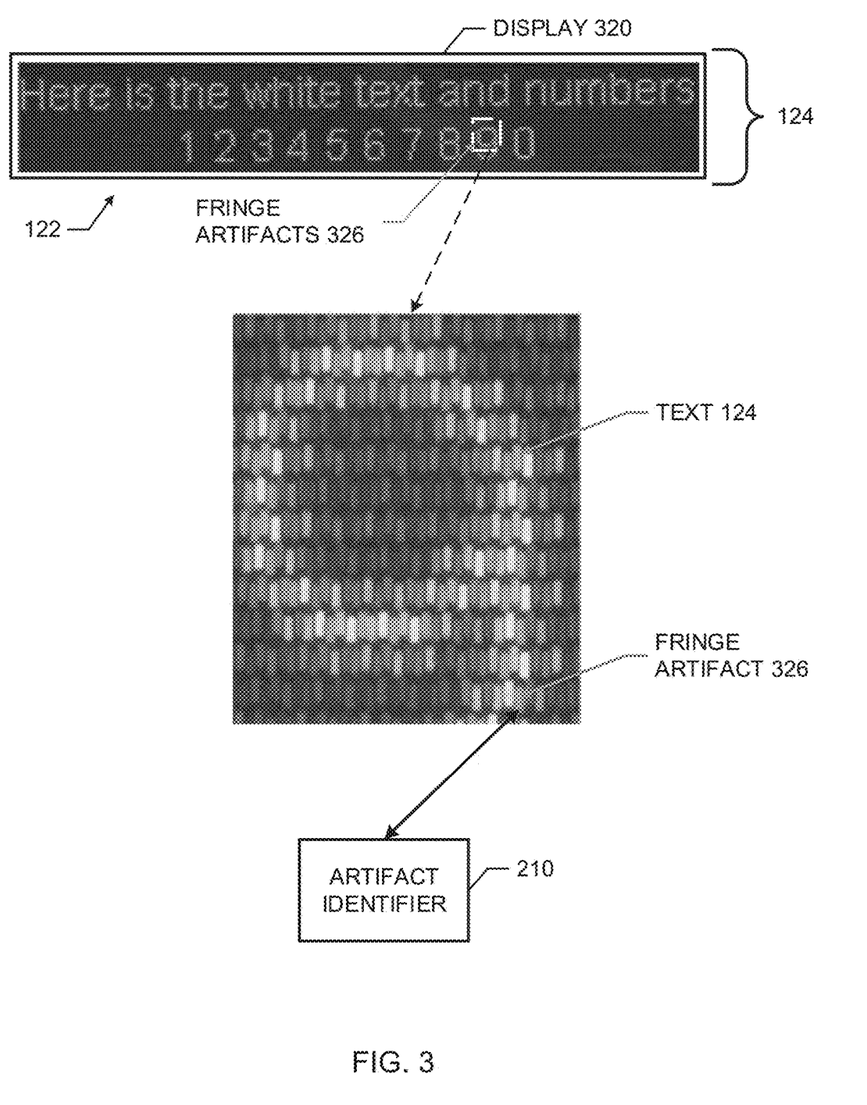
FIG. 3 illustrates an example artifact identified by the artifact manager of FIG. 1 or 2.

An example analysis performed by the artifact identifier 210 is further discussed with reference to FIG. 3. The artifact identifier 210 of FIG. 3 (which may be implemented by the artifact identifier 210 of FIG. 2) identifies artifacts in a display 120 (which may be implemented by the display 120 of FIG. 1. In FIG. 3, a zoomed view of a portion of the text 124 (e.g., a portion of the '9') including a fringe artifact 326 (e.g., a red dot artifact) is illustrated. The example artifact identifier 210 may identify the fringe artifact 326 in accordance with the examples herein.

In examples disclosed herein, the artifact identifier 210 may use the following analysis of the image 122 or portions of the image to identify pixels that may be potential red dot artifacts. In the following analysis, the artifact identifier 210 identifies spatial positioning (location) of potential red dot artifacts within the image 122 relative to the content of the image 122 (e.g., the text 124). For the following, let $I_{nm}$ be a vector field that maps an n dimensional spatial (length x, height y) space to an m dimensional color (red r, green g, blue b) space of the image 122 of FIG. 3. In examples disclosed herein, the vector field is analyzed to identify a maximized distance d such that the largest eigenvalue and its corresponding eigenvector of a matrix $D^TD$ are equivalent to a gradient magnitude and direction for the vector field. In examples disclosed herein is a second order partial derivative matrix of the vector field $I_{nm}$ along the spatial n and color m dimensions. The example second order derivative may avoid shifting the gradient while highlighting zero crossings in the image. Accordingly, a second order derivative of the vector field $I_{nm}$ may be represented by the following equation:

$$\frac{d^2 I_{mn}}{du^2} = I_{mn}(u+1) + I_{nm}(u-1) - 2I_{nm}(u) \tag{1}$$

where u is the spatial position of a point in the field as a subset of n while m spans the color dimension. Further, let the color image map a two dimensional color space (x,y) to a three dimensional color space (r, g, b). Then the matrix D can be written as:

$$D = \begin{bmatrix} \frac{d^2 r}{dx^2} & \frac{d^2 g}{dx^2} & \frac{d^2 b}{dx^2} \\ \frac{d^2 r}{dy^2} & \frac{d^2 g}{dy^2} & \frac{d^2 b}{dy^2} \end{bmatrix}^T \tag{2}$$

and using the following transpose of D, $$P = \left(\frac{d^2 r}{dx^2}\right)^2 + \left(\frac{d^2 g}{dx^2}\right)^2 + \left(\frac{d^2 b}{dx^2}\right)^2 \tag{3}$$

$$Q = \left(\frac{d^2 r}{dy^2}\right)^2 + \left(\frac{d^2 g}{dy^2}\right)^2 + \left(\frac{d^2 b}{dy^2}\right)^2$$

$$T = \left(\frac{d^2 r}{dx^2}\right)\left(\frac{d^2 r}{dy^2}\right) + \left(\frac{d^2 g}{dx^2}\right)\left(\frac{d^2 g}{dy^2}\right) + \left(\frac{d^2 b}{dx^2}\right)\left(\frac{d^2 b}{dy^2}\right)$$

the largest eigenvalue or the second derivative gradient is defined by:

$$d = 0.5(P+Q+\sqrt{(P+Q)^2 - 4(PQ-T^2)}) \tag{4}$$

In calculating the above, a gradient map is determined that identifies pixels (e.g., the pixel causing the fringe artifact 326 of FIG. 3) in locations of edges and corners in the image 122 or portions of the image 122 (e.g., a portion corresponding to three lines of pixels) that may potentially lead to red artifacts in the display 120, hereinafter referred to as artifact pixels.

In some examples, the gradient map may be thresholded by a limit $T_1$ to further determine candidate artifact pixels for color correction. For example, the limit $T_1$ may correspond to an intensity of a red subpixel that causes the fringe artifact 326. Accordingly, the potential artifact pixels may become candidate artifact pixels when the intensity of the potential artifact pixel satisfies the threshold $T_1$ (e.g., is greater than the threshold $T_1$).

In some examples, after identifying artifact pixel locations, the artifact identifier 210 may analyze an area surrounding the candidate artifact locations to determine whether an artifact exists. The artifact identifier 210 may determine whether the artifact is located on an edge of content (e.g., text, lines, or any other high contrast content). An example edge of the content may be an area of transmission between the content (e.g., the text, line, etc.) and a background of the content. Furthermore, based on an intensity of the surrounding (neighboring) pixels or subpixels, the artifact identifier 210 may determine whether or not the identified artifact pixel location causes an artifact on the display. More specifically, red dot artifacts in relatively bright neighborhoods may be less perceptible due to a higher order of spatial color mixing. Accordingly, in examples disclosed herein, the artifact identifier 210 may determine the location of artifacts when the potential artifact locations are in lower intensity neighborhoods. For example, a neighborhood N corresponds to the immediate pixels (or subpixels) centered around the artifact pixel potentially causing an artifact. Letting $B_{P_1}$ be the brightness of the artifact pixel and a be the brightness of pixels in the neighborhood N, then when $$\sum_{i=N} B_i/N < B_{P_1} \tag{5}$$

the artifact identifier 210 determines the artifact pixel is in a dark neighborhood.

Referring now to FIG. 2, the example artifact classifier 220 determines a type of artifact identified by the artifact identifier 210. In examples disclosed herein, the artifact classifier 220 may classify identified artifacts as singlet artifacts, doublet artifacts, or triplet artifacts. In examples disclosed herein, the artifact classifier 220 analyzes locations of artifact pixels and determines a distance between the artifact pixel and another artifact pixel.

Figure 4:
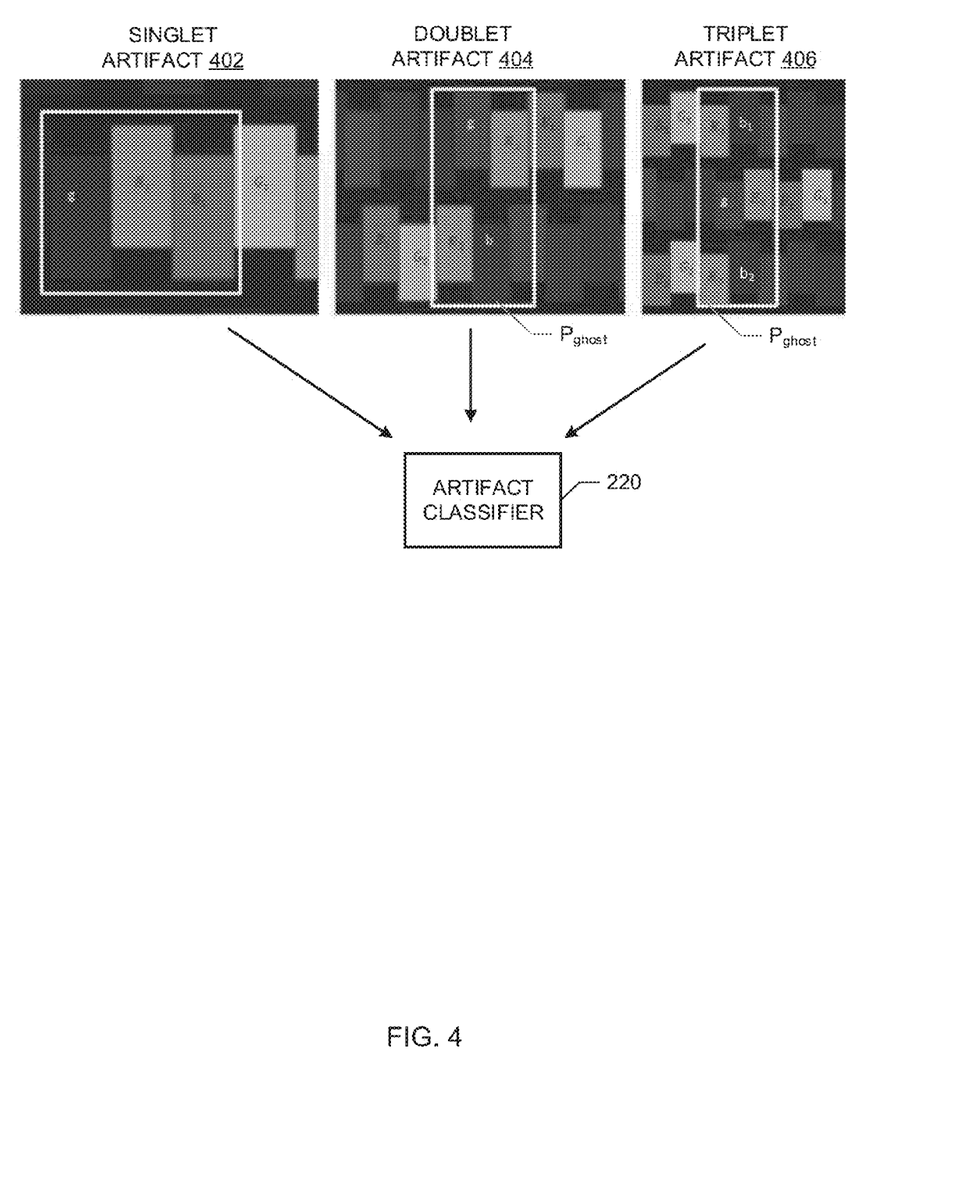
FIG. 4 illustrates example artifacts that may be classified by the artifact manager of FIG. 1 or 2.

If the artifact classifier 220 determines that an artifact pixel is not within a threshold distance of another artifact pixel, the artifact classifier 220 classifies artifact as a singlet artifact. For example, in FIG. 4, the artifact classifier identifies the artifact pixel $R_1$ but does not identify another artifact pixel within a neighborhood of the artifact pixel $R_1$. The threshold distance may be based on a whether the artifact pixels are neighboring pixels as defined above. If the artifact classifier 220 determines that an artifact pixel is within a threshold distance of another pixel, the artifact classifier 220 determines whether the artifact pixel is within a threshold distance of a single artifact pixel or multiple artifact pixels. For example, in FIG. 4 the artifact classifier 220 determines that the artifact pixel $R_1$ is within a threshold distance of a single artifact pixel $R_2$, the artifact classifier 220 determines that the type of the artifact pixel $R_1$ is a double artifact pixel. In some examples, the artifact classifier 220 determines that the artifact pixel $R_1$ is within a threshold distance of the artifact pixel $R_2$ of the doublet artifact 404 when the artifact classifier 220 determines that the artifact pixel $R_1$ is diagonally adjacent to the artifact pixel $R_2$. Furthermore, as illustrated in FIG. 4, the artifact classifier 220 determines that the artifact pixel $R_1$ is within a threshold distance of two artifact pixels $R_2$, $R_3$, the artifact classifier 220 determines that the type of the artifact pixel $R_1$ is a triplet artifact pixel. Examples of artifact pixel types and identification of the type of artifact pixel is further discussed below in connection with FIG. 4. In examples disclosed herein, upon detection of a doublet artifact pixel or triplet artifact pixel, the artifact pixels in the doublet artifact pixels or triplet artifact pixels are all corrected by the artifact corrector 230 of FIG. 2.

Referring now to FIG. 2, the artifact corrector 230 corrects the identified artifact pixels based on whether the artifact pixels are singlet artifacts, doublet artifacts, or triplet artifacts. The artifact corrector 230 may receive information (e.g., intensity, location, neighboring pixel intensity, etc.) corresponding to the artifact pixel from the artifact identifier 210 and/or the artifact classifier.

For correction of singlet artifacts, the artifact corrector 230 determines a neighboring pixel of the artifact pixel. For example, referring to the singlet artifact 402 of FIG. 4, the color corrector 230 identifies a neighboring pixel g of the artifact pixel $R_1$ is green. The color corrector 230 determines a color intensity of the green subpixel $G_1$ of the artifact pixel $R_1$ (i.e., $R_1$ and $G_1$ are subpixels of a same pixel) and sets the color intensity of the neighboring pixel equal to that of g. In examples, where the neighboring pixel g were blue, the color corrector 230 would set the intensity of the blue pixel to the same intensity as the blue subpixel B1. Accordingly, the singlet correction may be defined by:

$$g=G1$$
$$b=B1 \tag{6}$$

For correction of doublet artifacts, let the perceived intensity of the artifact pixels $R_1$ and $R_2$ of the doublet artifact 404 of FIG. 4 be $R_{tot}$. In examples disclosed herein, the artifact corrector 230 determines $R_{tot}$ based on radiant intensities $I_1$ and $I_2$ of $R_1$ and $R_2$, respectively to produce $I_{tot}$. The intensities of subpixels may be based on an intensity $I_o$ of a light source (e.g., a backlight of an LCD) and the transmittance of the subpixels. For example, on a backlit LCD:

$$I_{tot}=I_1+I_2$$

$$\tau(R_{tot})I_o=\tau(R_1)I_o+\tau(R_2)I_o \tag{7}$$

where $\tau$ is a transmittance constant. Accordingly, the perceived intensity of the doublet artifact 404 is given by $R_{tot}$:

$$R_{tot}=[(R_1^\gamma+R_2^\gamma)^{1/\gamma}]^{255} \tag{8}$$

Having identified $R_{tot}$, the artifact corrector 230 corrects intensities of the neighboring artifacts g and b of the doublet artifact 404 of FIG. 4. In the following example, the doublet artifacts and associated subpixels are considered as a part of a single ghost pixel $P_{ghost}$ such that:

$$P_{ghost} = \left(1 : \frac{G_1}{R_1} : \frac{B_1}{R_1}\right) \times R_{tot}. \tag{9}$$

and normalizing the ratio to the red channel perceived, the artifact corrector 230 corrects the intensities of the neighboring subpixels g and b using the following calculations to correct doublet artifacts:

$$g = \frac{G_1 R_{tot}}{R_1}$$ (10)

$$b = \frac{B_1 R_{tot}}{R_1}$$

Following correction of the doublet artifact, the perceived value of the red subpixels $R_1'$ and $R_2'$ would be:

$$R_1' = R_2' = \tau = R_{tot} \times (0.5)^{1/\gamma}$$ (11)

To correct triplet artifacts, the artifact corrector 230 may treat the triplet artifact as two doublets (i.e., a first pair of artifact pixels and a second pair of artifact pixels. In some examples, the artifact corrector 230 may treat the three artifact pixels as a single ghost pixel, similar to the above calculations for the doublet artifacts. Referring to FIG. 4, the ghost pixel $P_{ghost}$ of the triplet artifact 406 includes two blue neighboring subpixels $b_1$, $b_2$ and one green neighboring subpixel g (though in other example triplet artifacts the neighboring subpixels may include two green subpixels and one blue subpixel). For triplet artifacts, $R_{tot}$ may be calculated as follows to incorporate the third subpixel:

$$R_{tot} = [(R_1^\gamma + R_2^\gamma + R_3^\gamma)^{1/\gamma}]^{255}$$ (12)

and the artifact corrector 230 may adjust values of the neighboring pixels based on the following:

$$R_1' = R_2' = R_3' = R_{tot} \times 0.33^{1/\gamma}$$ (13)

$$b, g = \frac{(B_1, G_1) R_{tot}}{R_1 2^{1/\gamma}}$$

$$g, b = \frac{(G_1, B_1) R_{tot}}{R_1}.$$

Accordingly, the artifact corrector 230 may correct the intensities of the artifact pixels and/or neighboring pixels to remove the appearance of the artifacts from the display 120. The artifact corrector 230 makes the adjustments to the pixels/subpixels or neighboring pixels/subpixels based on the type of artifact identified by the artifact identifier 210 and classified by the artifact classifier 220.

While an example manner of implementing the artifact manager 112 of FIG. 1 is illustrated in FIG. 2, at least one of the elements, processes and/or devices illustrated in FIG. 2 may be combined, divided, re-arranged, omitted, eliminated and/or implemented in any other way. Further, the artifact identifier 210, the artifact classifier 220, the artifact corrector 230 and/or, more generally, the example artifact manager 112 of FIG. 2 may be implemented by hardware and/or any combination of hardware and executable instructions (e.g., software and/or firmware). Thus, for example, any of the artifact identifier 210, the artifact classifier 220, the artifact corrector 230 and/or, more generally, the example artifact manager 112 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the artifact identifier 210, the artifact classifier 220, and/or the artifact corrector 230 is/are hereby expressly defined to include a tangible computer readable storage device or storage disk such as a memory, a digital versatile disk (DVD), a compact disk (CD), a Blu-ray disk, etc. storing the executable instructions. Further still, the example artifact manager 112 of FIG. 2 may include at least one element, process, and/or device in addition to, or instead of, those illustrated in FIG. 2, and/or may include more than one of any or all of the illustrated elements, processes and devices.

Figure 5:
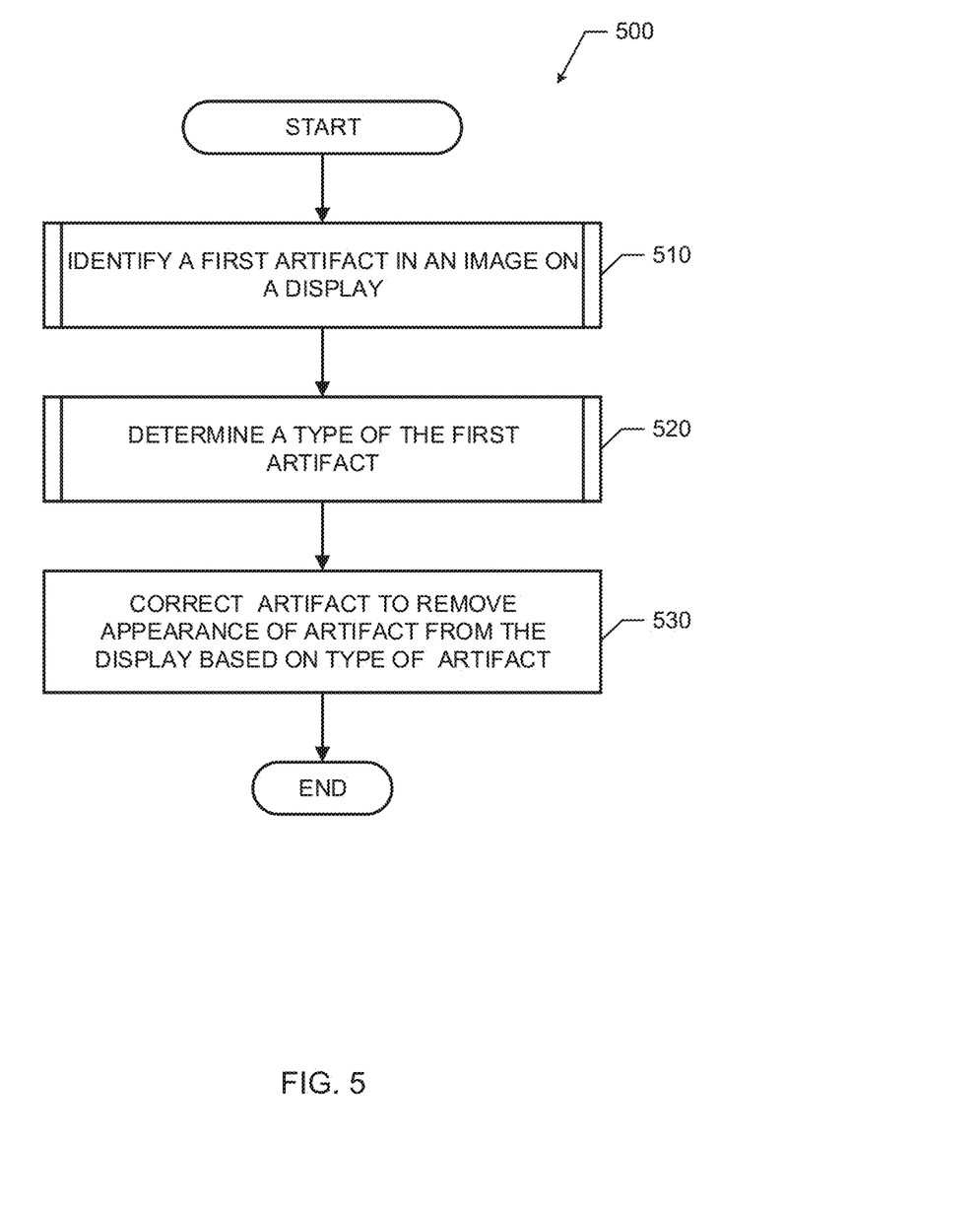
FIG. 5 is a flowchart representative of example machine readable instructions that may be executed to implement the artifact manager 112 of FIG. 2.
Figure 6:
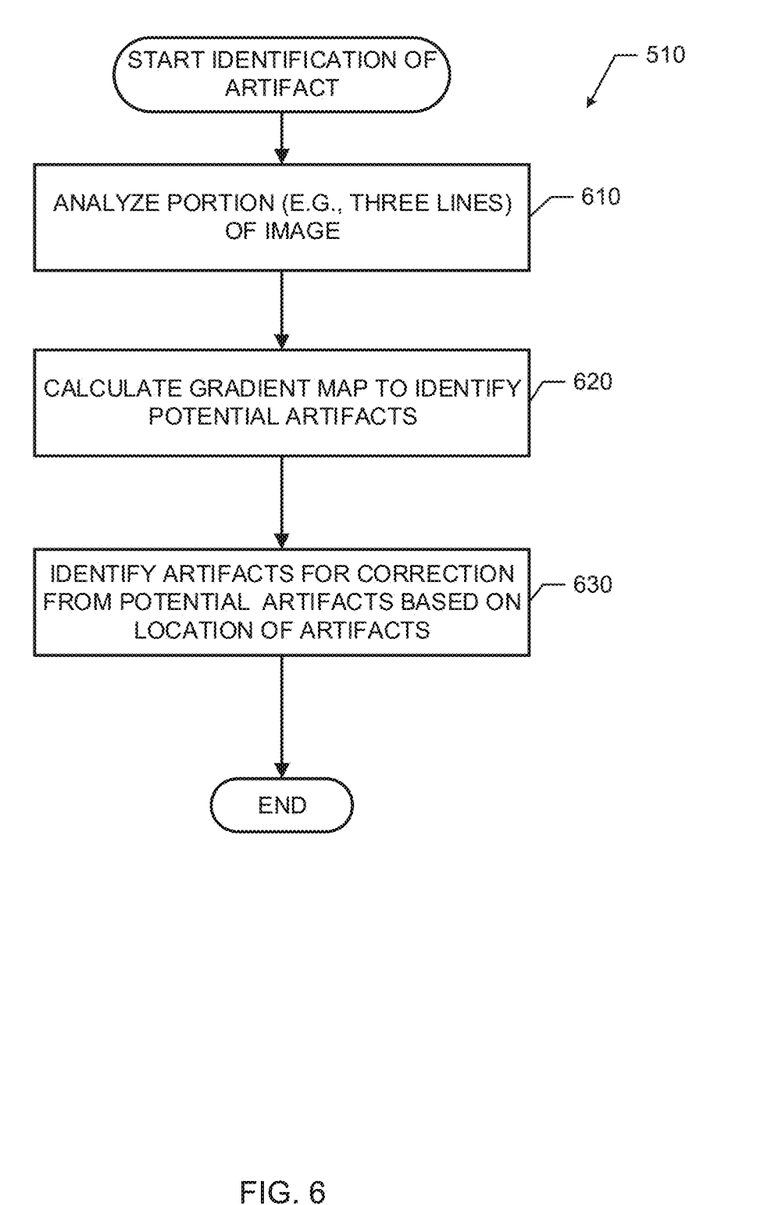
FIG. 6 is a flowchart representative of an example portion of the example machine readable instructions of FIG. 5 to implement an artifact identifier of the artifact manager of FIG. 2.
Figure 7:
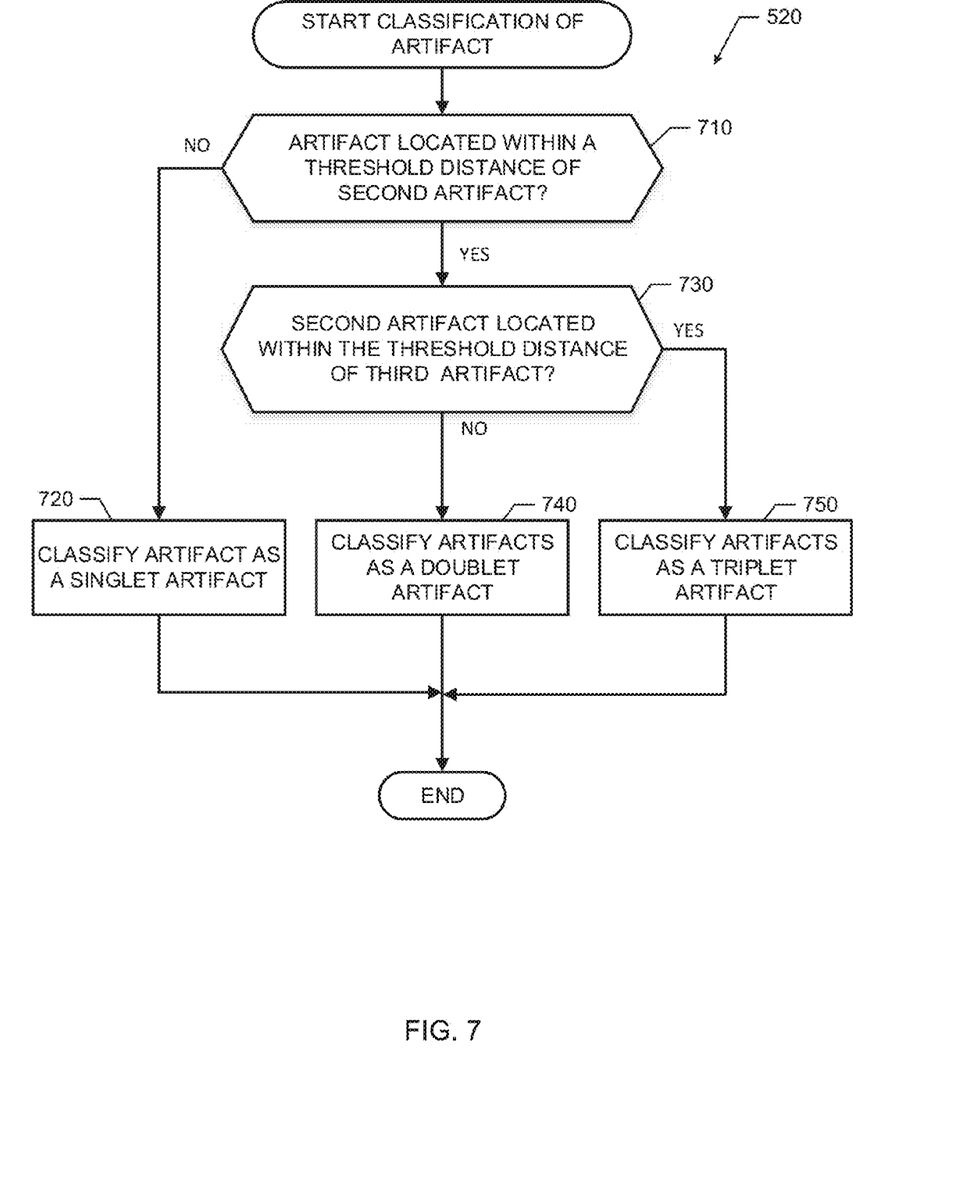
FIG. 7 is a flowchart representative of another example portion of the example machine readable instructions of FIG. 5 to implement an artifact classifier of the artifact manager of FIG. 2.

Flowcharts representative of example machine readable instructions for implementing the 112 of FIG. 2 are shown in FIGS. 5, 6, and 7. In this example, the machine readable instructions comprise program(s)/process(es) for execution by a processor such as the processor 812 shown in the example processor platform 800 discussed below in connection with FIG. 8. The program(s)/process(es) may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 812, but the entirety of the program(s)/process(es) and/or parts thereof could alternatively be executed by a device other than the processor 812 and/or embodied in firmware or dedicated hardware. Further, although the example program(s)/process(es) is/are described with reference to the flowcharts illustrated in FIGS. 5, 6, and/or 7, many other methods of implementing the example artifact manager 112 may alternatively be used. For example, the order of execution of the blocks may be changed, and/or some of the blocks described may be changed, eliminated, or combined.

The example process 500 of FIG. 5 begins with an initiation of the artifact manager 112 (e.g., upon startup, upon instructions from a user, upon startup of a device implementing the artifact manager (e.g., the display controller 110), etc.). The example process 500 of FIG. 5 may be executed to identify, classify, and correct artifacts in a display to enhance the resolution of the display. At block 510, the artifact identifier 210 identifies a first artifact in the image 122 on the display 120. The artifact identifier 210 may calculate a second derivative gradient of a vector (e.g., a mapping of spatial dimensions of the image 122 to color dimensions of the image 122) of the image 122 to identify the first artifact. An example implementation of block 510 is further discussed below in connection with FIG. 6.

At block 520, the artifact classifier 220 determines a type of the first artifact. For example, at block 520, the artifact classifier 220 may determine whether the artifact is a singlet artifact (including one artifact pixel), a doublet artifact (including two artifact pixels), or a triplet artifact (including three or more artifact pixels). An example implementation of block 520 is further discussed below in connection with FIG. 7. At block 530, the artifact corrector 230 corrects the artifact to remove the appearance of the artifact from the display based on the type of artifact. In examples disclosed herein, the artifact corrector 230 may correct the artifact by adjusting color settings (e.g., intensities) of neighboring pixels or subpixels surrounding artifact pixels causing the artifact in accordance with examples herein. Accordingly, the artifact corrector 230 performs a singlet correction, a doublet correction, or triplet correction based on whether the artifact is a singlet artifact, a doublet artifact, or a triplet artifact, respectively. After block 530, the example process 500 ends. In some examples, the process 500 is iteratively executed such that the process 500 is executed for a portion of the image 122. In such examples, the process 500 may be iteratively executed for each portion of the image 122 until the entire image 122 is analyzed to detect and correct any artifacts.

The example process 600 of FIG. 6 (which may be executed to implement block 510 of FIG. 5) begins with an initiation of the artifact manager 112. The process 600 is executed to identify artifacts in an image (or a portion of an image) in accordance with examples herein. At block 610, the artifact identifier 210 analyzes a portion of the image 122. For example, at block 610, the artifact identifier 210 may analyze (e.g., read, scan, etc.) display data corresponding to a number lines (e.g., three lines) of pixels of the display 120. At block 620, the artifact identifier 210 calculates a gradient map to identify potential artifacts in the portion of the image 122. For example, at block 210, the artifact identifier 210 may analyze a vector of the portion of the image 122 that maps spatial dimensions (e.g., two-dimensional space (x,y)) to color dimensions (e.g., red, green, blue) of the portion of the image 122 and calculate a second derivate of the vector to generate the gradient map. From the gradient map, the artifact identifier 210 identifies locations of pixels that may be artifact pixels in the image 122 (e.g., based on eigenvalues for locations of artifact pixels).

At block 630 of the example process 600 of FIG. 6, the artifact identifier 210 identifies artifacts that are to be corrected from the potential artifacts based on the location of the artifacts in the image 122. For example, at block 630, the artifact identifier 210 may determine whether the potential artifact pixels are located in a dark neighborhood of the image 122 or a bright neighborhood of the image 122. In such an example, the artifact identifier 210 may determine that artifact pixels in the dark neighborhood are to be corrected and artifact pixels in bright neighborhoods are to be ignored. After block 630, the example process 600 ends. In some examples, after block 640, control may advance to block 520 of FIG. 5.

The example process 700 of FIG. 7 (which may be executed to implement block 520 of FIG. 5) begins with an initiation of the artifact manager 112. The process 700 is executed to determine types of artifacts (i.e., classify artifacts) identified in an image (or a portion of an image) in accordance examples herein. At block 710, the artifact classifier 220 determines whether an artifact (artifact pixel) is located within a threshold distance of a second artifact (or a second artifact pixel). In some examples, the artifact is within a threshold distance of a second artifact when the artifacts are neighboring artifacts or in pixels that are neighbors of one another (e.g., pixels located diagonally adjacent one another in a triangular row arrangement (see the doublet artifact 404 or triplet artifact 406 of FIG. 4)). If the identified artifact is not within the threshold distance of a second artifact, the artifact classifier 220 classifies the artifact as a singlet artifact (block 720). If, at block 510, the artifact identifier 220 determines that the artifact is located within a threshold distance of a second artifact, the artifact classifier 220 determines whether the second artifact is within the threshold distance of a third artifact (block 730)

If, at block 730, the artifact classifier 220 determines that the second artifact is not within the threshold distance of a third artifact, the artifact classifier 220 classifies the artifacts as a doublet artifact (e.g., see the doublet artifact 404 of FIG. 4) at block 740. If the artifact classifier 220 determines that the second artifact is within a threshold distance of a third artifact (block 730), the artifact classifier classifies the artifacts as a triplet artifact at block 750. After the artifact classifier 220 classifies the artifacts at block 720, 740, 750, the example process 700 ends. In some examples, after blocks 720, 740, 750, the artifact classifier 220 provides artifact information (e.g., classification information, location information, neighbor pixel information, intensities, etc.) to the artifact corrector 230 for correction of the artifacts in the display 120 in accordance with examples herein.

As mentioned above, the example processes of FIGS. 5, 6, and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally, or alternatively, the example processes of FIGS. 5, 6, and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 8:
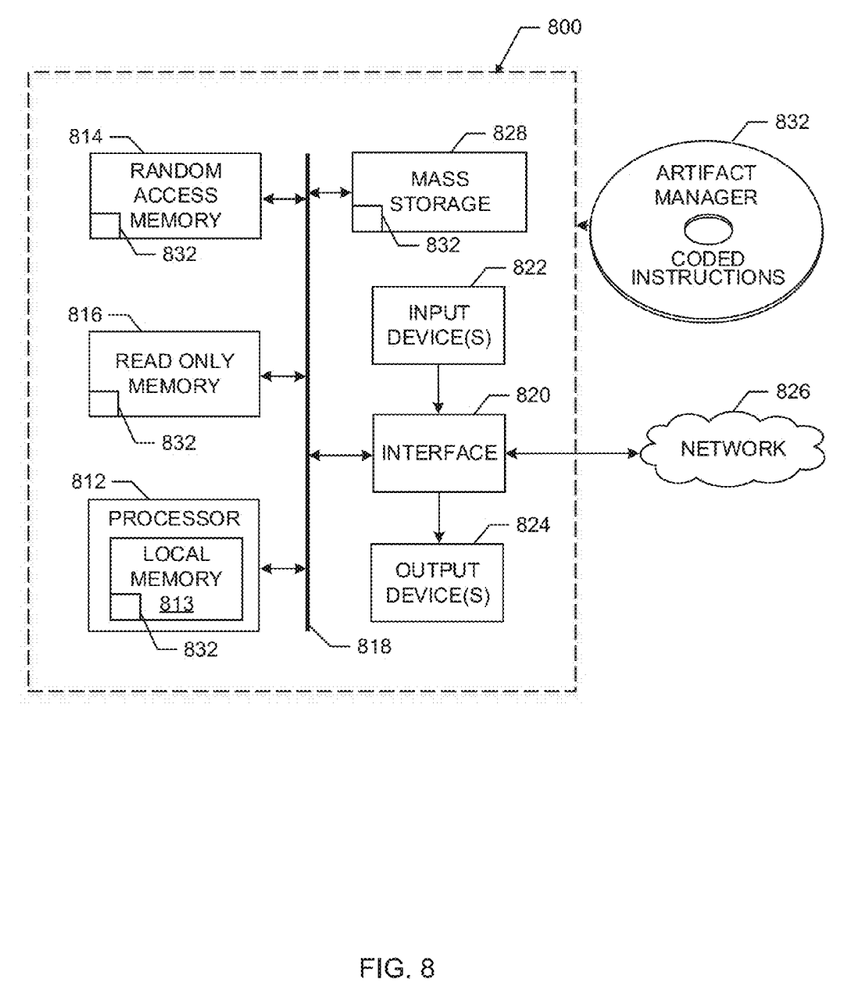
FIG. 8 is a block diagram of an example processor platform capable of executing the instructions of FIGS. 5, 6, and/or 7 to implement the artifact manager of FIG. 2.

FIG. 8 is a block diagram of an example processor platform 800 capable of executing the instructions of FIGS. 5, 6, and/or 7 to implement the artifact manager 112 of FIG. 2. The example processor platform 800 may be or may be included in any type of apparatus, such as a server, a personal computer, a mobile device (e.g., a cell phone, a smart phone, a tablet, etc.), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example of FIG. 8 includes a processor 812. The processor 812 of the illustrated example is hardware. For example, the processor 812 can be implemented by at least one integrated circuit, logic circuit, microprocessor or controller from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a peripheral component interconnect (PCI) express interface.

In the illustrated example, at least one input device 822 is connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 824 is also connected to the interface circuit 820 of the illustrated example. The output device(s) 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, may include a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes at least one mass storage device 828 for storing executable instructions (e.g., software) and/or data. Examples of such mass storage device(s) 828 include floppy disk drives, hard drive disks, compact disk drives, Blu-ray disk drives, RAID systems, and digital versatile disk (DVD) drives.

The coded instructions 832 of FIGS. 5, 6, and/or 7 may be stored in the mass storage device 828, in the local memory 813 in the volatile memory 814, in the non-volatile memory 816, and/or on a removable tangible computer readable storage medium such as a CD or DVD.

From the foregoing, it will be appreciated that the above disclosed methods, apparatus, and articles of manufacture enhance resolution of displays by identifying and correcting artifacts (e.g., fringe artifacts) in the displays. In examples disclosed herein, artifacts are identified in an image of a display (e.g., using a second derivative gradient and location analysis within an image of the display), classified based on type of artifacts (e.g., as singlet, doublet, triplet, etc.), and corrected based on the type of artifact identified. Accordingly, the artifacts may be automatically corrected to be removed from the image to provide a relatively clear image in the display. Examples disclosed herein provide for dynamic or real time (e.g., within 10 ms) enhancement of a display.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. An apparatus comprising:
   an artifact identifier to identify artifacts in an image presented on the display, the artifacts caused by artifact pixels, wherein the artifact identifier is to:
   identify potential artifact pixels corresponding to the artifacts;
   determine that intensities of the potential artifact pixels satisfies a threshold; and
   identify the potential artifact pixels as artifacts when the potential artifact pixels are in a dark neighborhood of the image the apparatus further comprising;
   an artifact classifier to classify the artifacts in the image as singlet artifacts, doublet artifacts, or triplet artifacts based on locations of the artifact pixels; and
   an artifact corrector to correct the artifacts to remove the artifacts from the display based on whether the artifacts are singlet artifacts, doublet artifacts, or triplet artifacts.

2. The apparatus of claim 1, wherein the artifact classifier classifies the artifacts as singlet artifacts when the artifacts are not diagonally adjacent other artifacts.

3. The apparatus of claim 1, wherein the artifact classifier classifies the artifacts as doublet artifacts when the artifacts are diagonally adjacent to one other artifact.

4. The apparatus of claim 1, wherein the artifact classifier classifies the artifacts as triplet artifacts when the artifacts are diagonally adjacent to two other artifacts.

5. The apparatus of claim 1, wherein the artifact classifier classifies the artifacts as doublet artifacts when the location of the artifacts are less than a threshold distance from one other artifact.

6. The apparatus of claim 1, wherein the artifact classifier classifies the artifacts as triplet artifacts when:
   the location of a first artifact is less than a threshold distance from a second artifact, and
   the location of the first artifact is less than a threshold distance from a third artifact.

7. The apparatus of claim 1, wherein the artifact corrector to correct the artifacts to remove the artifacts from the display comprises:
   the artifact corrector to adjust an intensity of at least one pixel of the image.

8. The apparatus of claim 1, wherein the artifact identifier is to identify artifacts in the image presented on the display based on intensities of subpixel components of pixels of the image.

9. The apparatus of claim 1, wherein the artifact identifier is to identify artifacts in the image presented on the display based on second derivative gradient. vectors of the image, the vectors comprising a mapping of spatial dimensions of the image to color dimensions of the image.

* * * * *

UNITED STATES PATENT AND TRADEMARK OFFICE
CERTIFICATE OF CORRECTION

| | |
|---|---|
| PATENT NO. | : 9,620,082 B2 |
| APPLICATION NO. | : 14/713278 |
| DATED | : April 11, 2017 |
| INVENTOR(S) | : Eli Saber et al. |

It is certified that error appears in the above-identified patent and that said Letters Patent is hereby corrected as shown below:

In Column 12, Line 58 approx., in Claim 9, delete "gradient." and insert -- gradients of --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*